United States Patent [19]

Kimura

[11] Patent Number: 4,489,350
[45] Date of Patent: Dec. 18, 1984

[54] SOLID-STATE IMAGE PICKUP DEVICE
[75] Inventor: Kenji Kimura, Tokyo, Japan
[73] Assignee: Olympus Optical Co., Ltd., Tokyo, Japan
[21] Appl. No.: 396,778
[22] Filed: Jul. 9, 1982
[30] Foreign Application Priority Data Jul. 22, 1981 [JP] Japan ................. 56-114626

[51] Int. Cl.³ .................. H04N 3/14; H04N 5/26
[52] U.S. Cl. .................... 358/213; 358/228
[58] Field of Search ............ 358/228, 213, 212

[56] References Cited

U.S. PATENT DOCUMENTS

| 3,576,393 | 4/1971 | Thompson | 358/228 |
| 3,934,161 | 1/1976 | Caywood | 358/213 |
| 4,327,378 | 4/1982 | Tanaka et al. | 358/228 |

FOREIGN PATENT DOCUMENTS

| 2055639 | 12/1971 | Fed. Rep. of Germany . |
| 4852348 | 7/1978 | Japan . |
| 55-163950 | 12/1980 | Japan . |

Primary Examiner—John C. Martin
Assistant Examiner—Erin A. McDowell
Attorney, Agent, or Firm—Frishauf, Holtz, Goodman and Woodward

[57] ABSTRACT

A solid-state image pickup device has an image pickup element with a light-receiving surface on which a plurality of photoelectric conversion cells are arranged; a timing circuit, coupled to at least one and less than all of said photoelectric conversion cells of the image pickup element, for generating a timing signal when an output level of the photoelectric conversion cell corresponding to the amount of light incident on the photoelectric conversion cell connected thereto reaches a predetermined reference level; and a data reading unit coordinated with a shutter, coupled to the timing circuit for optically shielding the light-receiving surface of the image pickup element in response to the timing signal. The data reading unit reads image data on the light-receiving surface in an interval following the timing signal.

13 Claims, 2 Drawing Figures

SOLID-STATE IMAGE PICKUP DEVICE

BACKGROUND OF THE INVENTION

The present invention relates to an improvement in a solid-state image pickup device.

More solid-state image pickup devices are currently being used as image sensors than conventional image pickup tubes. A solid-state image pickup element generally comprises a matrix of integrated semiconductor photoelectric conversion cells. Therefore, the solid-state image pickup element is light in weight, compact in size, high in vibration resistance, consumes less power, and is high in reliability. The arrangement of the photoelectric conversion cells, that is, the arrangement of the picture elements of the light-receiving surface, is fixed, and the clock pulses for obtaining outputs from the respective cells are also specifically defined. For this reason, if the distortion introduced by the optical system is excluded, the figurative distortion of the resultant image is very small.

If such a solid-state image pickup element is used for a television camera, the reading frequency of the image data for one frame is fixed at 1/30 sec. The amount of light incident on the image pickup conversion cell is generally set to be an intermediate value between the saturation level of the photoelectric conversion cell and the dark current level. If the reading period of the image data is relatively short and is constant, the amount of light incident on the element may remain at such a value. However, if the reading frequency changes irregularly, as in the case of exposure control through adjustment of the exposure time, the amount of light on the element must be varied in accordance with such an irregular change. If the reading period of the image data is very long, the intensity of light incident on the image pickup element must be made extremely small. In such a case, the exposure or the integrated value of the amount of incident light rays as a function of time changes during reading of the image data. Accordingly, a photoelectric conversion output from the initial cell differs significantly from that from the last cell. Uniform photoelectric conversion sensitivity cannot therefore be obtained over the entire surface of the image pickup element.

SUMMARY OF THE INVENTION

With this in mind, present invention has been designed to provide a solid-state image pickup device which is capable of achieving a uniform sensitivity over the entire surface of an image pickup surface independently of the reading period or reading frequency of data.

In order to achieve the above objective, the present invention provides a solid-state image pickup device wherein the light-receiving surface is optically shielded by utilizing an output from at least one of the photoelectric conversion cells (which constitute the light-receiving surface of the image pickup element) prior to those cells becoming saturated. While the light-receiving surface is optically shielded, the image data is read from all the photoelectric conversion cells.

With the device as described above, the amount of image data from each photoelectric conversion cell does not change during reading even if the reading frequency of the image data is low. Accordingly, a solid-state image pickup device is obtained which has a uniform sensitivity over the entire surface of the screen. Since optical shielding is performed before the photoelectric cells are saturated, overexposure or unbalanced contrast of the image will not result.

In the present invention, the image pickup element can be operated at a level (immediately below the saturation level) at which photoelectric conversion sensitivity is optimal. In other words, a highly sensitive solid-state image pickup device is obtained by optically shielding the light-receiving surface to the extent that the photoelectric conversion cells do not become saturated but a maximum output level is ensured.

The photoelectric conversion cell for optical shielding is at least one cell, preferably a plurality of cells and in any case less than all of the cells, preferably arranged at the center of the light-receiving surface. This is because the subject has an optimum brightness at the central region of the light-receiving surface. If the timing for optical shielding is set in accordance with the mean level of the respective outputs from the plurality of cells, the mean light amount incident on the central region of the light-receiving surface may be set at a level immediately below that at which the photoelectric cell is saturated.

The time interval for performing optical shielding may be longer than that required for the reading of image data of one frame. However, in order to perform continuous image pickup operation, it is preferable to perform optical shielding just during the reading of image data.

DETAILED DESCRIPTION OF THE PREFERRED EMBODIMENTS

Figure 1:
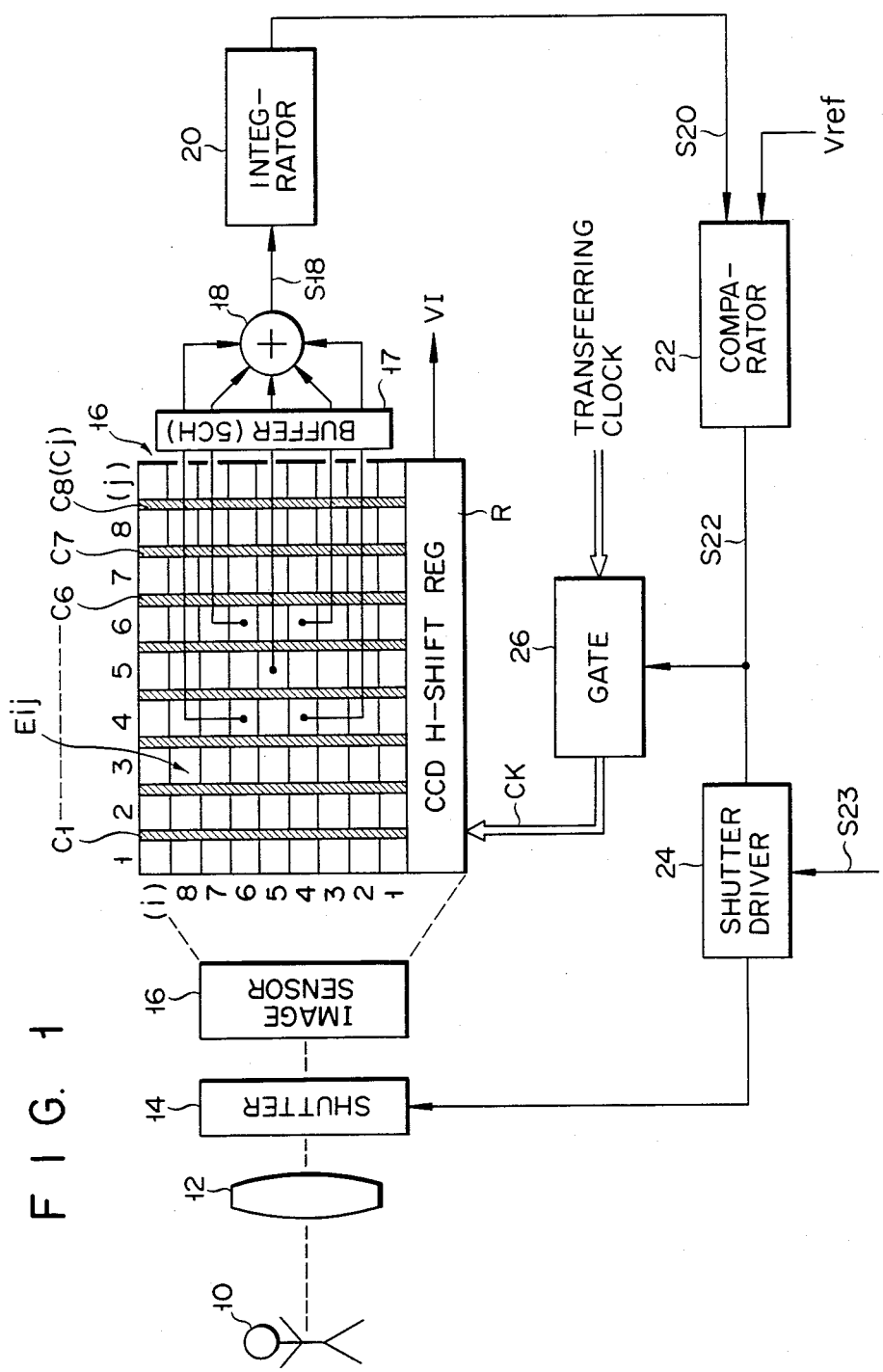
FIG. 1 is a block diagram of a solid-state image pickup device which shows one embodiment of the present invention.

One embodiment of the present invention will now be described with reference to the accompanying drawings. An image of a subject 10 is formed on the light-receiving surface of a solid-state image pickup element 16 through a lens system 12 and a shutter mechanism 14. The image pickup element 16 has a plurality of photoelectric conversion cells Eij which are patterned in a matrix form, CCD vertical shift registers Cj for performing charge transfer in the row direction (i), and a CCD horizontal shift register R for transferring the charge read by the vertical shift registers Cj in the column direction (j). The number of cells Eij is selected in accordance with the application of the device. For example, if a particularly high resolution is not required, a CCD image sensor having 200×200 cells (picture elements) may be used as the image pickup element 16. However, an image sensor having 8×8 cells is shown in FIG. 1 for the sake of simplicity.

A charge corresponding to the amount of incident light is stored in each cell Eij. Therefore, a charge distribution corresponding to the image of the subject 10 is formed over all the cells Eij. The charge (image data) stored at the respective cells Eij is read through the CCD vertical shift registers Cj and the CCD horizontal shift register R in response to clock pulses of a constant frequency. When a clock pulse CK for horizontal/vertical charge transfer is supplied to the shift register R through a gate circuit 26, image data VI is obtained from the shift register R in the form of time-serial data.

Prior to reading the image data VI, the charge stored on the cells at the central portion of the image pickup element 16 is extracted. Charge or outputs from cells E64, E66, E55, E44 and E46 are supplied to an analog adder 18 through a buffer circuit 17 having five independent channels. An output signal S18 from the analog adder 18 is supplied to an integrator 20 which outputs an integration output signal S20 corresponding to the mean charge of five cells connected to the analog adder 18. The integration output signal S20 represents the mean light amount at the central region of the light-receiving surface of the image pickup element 16. The signal S20 is supplied to a comparator 22 which produces a timing signal S22 when the level of the signal S20 exceeds a predetermined reference level Vref.

The reference level Vref is experimentally determined to correspond to that immediately before the output from the image pickup element 16 is saturated. The reference level Vref corresponds to the maximum level within the range wherein the input light amount vs. output level (stored charge) characteristics of the cells Eij of the image pickup element 16 are not saturated.

Parts 18, 20 and 22 as described above are coupled to at least one photoelectric conversion cell Eij of the image pickup element 16, thus constituting a first means for generating a timing signal S22 when the output level from the photoelectric conversion cell reaches the reference level Vref.

The timing signal S22 is supplied to a shutter driver 24 and to a gate circuit 26. In response to a shutter release signal S23, the shutter driver 24 releases the shutter mechanism 14. In response to the timing signal S22, the shutter driver 24 closes the shutter mechanism 14. The gate circuit 26 is turned on to supply the clock pulses CK to the shift registers Cj and R during a time interval from the reception of the timing signal S22 to the completion of reading of charge from all the cells Eij of the image pickup element 16.

Parts 14, 24, 26, Cj and R are coupled to the first means (18, 20 and 22) and make up a second means which optically shields the light-receiving surface of the solid-state image pickup element and which reads the image data on the cells Eij.

The device shown in FIG. 1 operates in the manner to be described below. A case of a still photograph will be considered.

Figure 2:
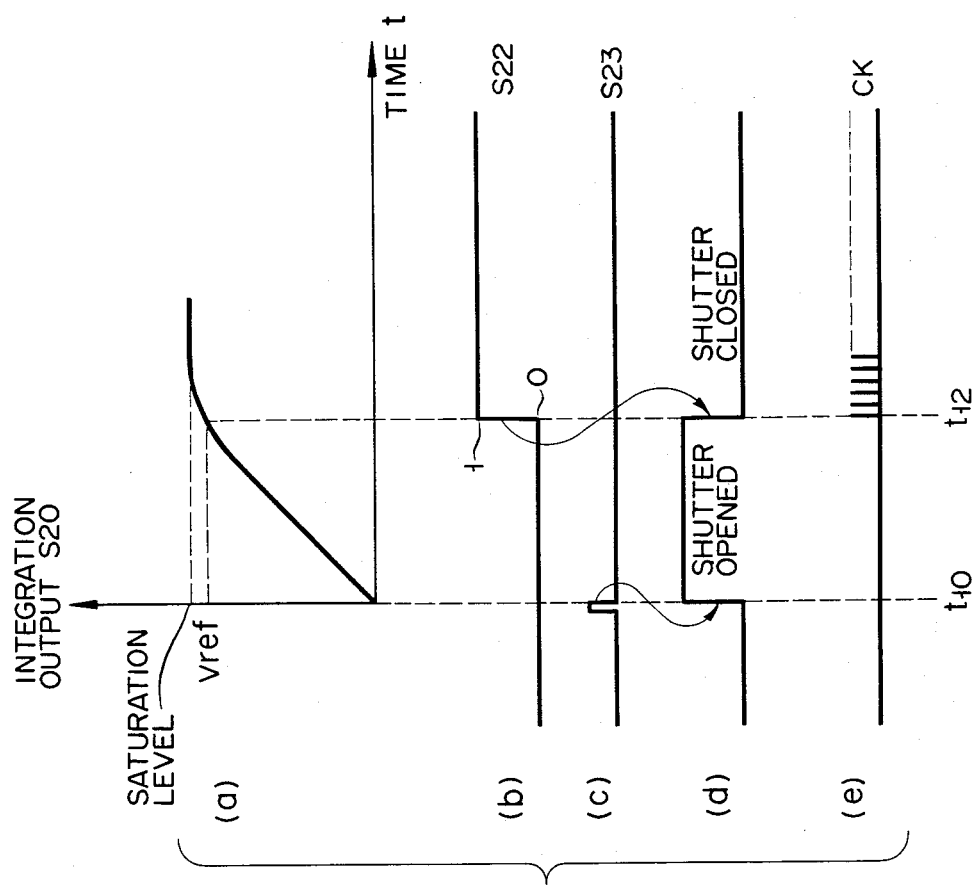
FIG. 2 is a timing chart for explaining the mode of operation of the device shown in FIG. 1.

Assume that no charge is stored on any cell Eij of the image pickup element 16 before time t10 in FIG. 2. When the shutter release signal S23 (FIG. 2c) is supplied to the shutter driver 24 at time t10, the shutter mechanism 14 is released (FIG. 2d). Then, charge corresponding to the brightness distribution of the image of the subject 10 is stored on each cell Eij of the element 16 until the outputs (accumulated charge) from the cells Eij saturate (FIG. 2a). In general, the central portion of the light-receiving surface of the element 16 is brightest; the cell corresponding to the central portion is saturated first. Therefore, if the integration output signal S20 from the central cell is set at a critical level only slightly below the saturation level, the remaining cells may not be saturated. This critical level is determined in accordance with the reference level Vref. Thus, the reference level Vref is set to be a level slightly lower than the saturation level of the integration output signal S20 (FIG. 2a).

When the integration output signal S20 exceeds the reference level Vref at time t12, the timing signal S22 goes from logic level "0" to logic level "1" (FIG. 2b). When the timing signal S22 of logic level "1" is supplied to the shutter driver 24, the shutter driver 24 closes the shutter mechanism 14 (FIG. 2d). Then, storage of the charge on each cell Eij of the element 16 is interrupted. When the timing signal S22 goes to logic level "1", the gate circuit 26 is turned on. Then, clock pulses CK (FIG. 2e) are supplied to the shift registers Cj and R, and the shift register R outputs the image data VI. The shutter mechanism 14 remains closed while the image data VI for one frame is read. For this reason, the charge on each cell Eij will not change during reading of the image data VI. When reading of the image data VI is completed, the state before time t10 is restored.

By repeating the operation as described above, continuous still photography or motion photography may be achieved. Even if the repeating frequency of the operation cycle as described above is random, the image data VI may be read from the cells Eij after these cells have been exposed to a level immediately below the saturation level. Accordingly, a solid-state image pickup device with high sensitivity and good S/N ratio may be manufactured. Since the reading frequency (period) of the image data VI may be arbitrarily selected while guaranteeing a high sensitivity, advantages are obtained which have been impossible to obtain with conventional devices. For example, if the read image data VI is to be stored in an IC memory, an inexpensive IC memory may be used since the memory access time need not be too fast. Accordingly, the manufacturing cost of the overall device may be reduced to a minimum.

The embodiments described in the text and shown in the drawings must not be understood in a restrictive manner; various changes and modifications may be made within the spirit and scope of the present invention. For example, the solid-state image pickup element 16 is not limited to one which has photoelectric conversion cells which are arranged in the matrix form. If the subject 10 is one-dimensional, a one-dimensional image sensor array may be used as the element 16.

In place of the CCD image sensor, the element 16 may comprise an MOS image sensor, or a BBD image sensor which includes photoelectric conversion cells which in turn comprise MOS transistors or photodiodes.

The optical system for forming an image on the light-receiving surface of the element 16 is not limited to the lens system 12. The optical system may be of any structure as that used in an endoscope or the like as long as it is capable of forming a desired image on the element 16.

The photoelectric conversion cell Eij selected to generate the timing signal S22 need not be the one at the center of the light-receiving surface of the element. If a photograph of a subject which is of uniform brightness over the entire light-receiving surface of the element 16 is to be taken, a cell near to any corner of the light-receiving surface may be selected. The number of cells to be selected may also be freely chosen. For example, the timing signal S22 may be obtained from a single cell E55 at the center or from all the cells E11 to E88.

The means for optically shielding the element 16 is not limited to the shutter mechanism 14. For example, a pivotal mirror or the like may be used to shift or deviate the optical path of the image of the subject 10 from the light-receiving surface of the element 16. If the subject 10 is in a dark environment, illumination of the subject 10 may be interrupted. Such a technique is disclosed in Japanese patent application No. 55-61347 filed on May 9, 1980 by the same applicant as that of the present invention. This Japanese patent application corresponds to U.S. patent application No. 260,299 entitled "Image Pickup Apparatus" which was filed on May 4, 1981. Turning on and off of the light source lamp 21 in this apparatus corresponds to release and closure of the shutter mechanism 14 in the present application. The contents of the Japanese patent application and the corresponding U.S. patent application mentioned above are incorporated in the present invention. If the photosensing operation (charge storage) of the element 16 can be electrically controlled, it may be interrupted by the output signal from the shutter driver 24.

In place of the signal charge transfer method as shown in FIG. 1, the X-Y address method may be used for reading the image data from each cell Eij of the element 16. For example an X (horizontal) scanning shift register and a Y (vertical) scanning shift register are arranged in the row and column directions, respectively, of the MOS image sensor matrix. The image data may be read by sequentially accessing the address of each cell by means of these X and Y registers.

The device of the present invention may be combined with those of the patent applications of the same applicant presented below:

(1) U.S. patent application No. 262,917 entitled "Focusing Apparatus for Image Pickup Device" which was filed on May 12, 1981.

(2) U.S. patent application No. 262,918 entitled "Focus Control Apparatus" which was filed on May 12, 1981.

The contents of these U.S. patent applications are incorporated in the present application.

What is claimed is:

1. A solid-state image pickup device comprising:
    an image pickup element with a light-receiving surface on which a plurality of photoelectric conversion cells are arranged;
    first means, coupled to at least one and less than all of said photoelectric conversion cells of said image pickup element, for generating a timing signal when an output level of said at least one photoelectric conversion cell corresponding to an amount of light incident on said at least one photoelectric conversion cell connected thereto reaches a predetermined reference level;
    second means, coupled to said first means, for optically shielding said light-receiving surface of said image pickup element in response to the timing signal; and
    third means, coupled to said first means for reading image data on said light-receiving surface, in an interval following said timing signal, in response to the timing signal.

2. The device of claim 1, wherein the predetermined reference level of said first means corresponds to a maximum level at which an input light amount vs. output level characteristic of said photoelectric conversion cells is not saturated.

3. The device of claim 1, wherein said at least one photoelectric conversion cell coupled to said first means is located substantially at the center of said light-receiving surface of said image pickup element.

4. The device of claim 1, wherein a plurality of said photoelectric conversion cells are coupled to said first means, and said first means is constituted for comparing an average output level of said plurality of said photoelectric conversion cells with the predetermined reference level, said first means generating the timing signal when the average output level coincides with the predetermined reference level.

5. The device of claim 3, wherein a plurality of said photoelectric conversion cells are coupled to said first means, and said first means is constituted for comparing an average output level of said plurality of said photoelectric conversion cells with the predetermined reference level, said first means generating the timing signal when the average output level coincides with the predetermined reference level.

6. The device of claim 1, wherein said second means includes shutter means for optically shielding said light-receiving surface of said image pickup element in response to the timing signal, said shutter means being constituted for optically shielding said light-receiving surface while the image data is read.

7. The device of claim 3, wherein said second means includes shutter means for optically shielding said light-receiving surface of said image pickup element in response to the timing signal, said shutter means being constituted for optically shielding said light-receiving surface while the image data is read.

8. The device of claim 4, wherein said second means includes shutter means for optically shielding said light-receiving surface of said image pickup element in response to the timing signal, said shutter means being constituted for optically shielding said light-receiving surface while the image data is read.

9. The device of claim 5, wherein said second means includes shutter means for optically shielding said light-receiving surface of said image pickup element in response to the timing signal, said shutter means being constituted for optically shielding said light-receiving surface while the image data is read.

10. The device of claim 2, wherein said at least one photoelectric conversion cell coupled to said first means is located substantially at the center of said light-receiving surface of said image pickup element.

11. The device of claim 2, wherein a plurality of said photoelectric conversion cells are coupled to said first means, and said first means is constituted for comparing an average output level of said plurality of said photoelectric conversion cells with the predetermined reference level, said first means generating the timing signal when the average output level coincides with the predetermined reference level.

12. The device of claim 2, wherein said second means includes shutter means for optically shielding said light-receiving surface of said image pickup element in response to the timing signal, said shutter being constituted for optically shielding said light-receiving surface while the image data is read.

13. The device of claim 11, wherein said second means includes shutter means for optically shielding said light-receiving surface of said image pickup element in response to the timing signal, said shutter means being constituted for optically shielding said light-receiving surface while the image data is read.

* * * * *